Patented Sept. 23, 1930

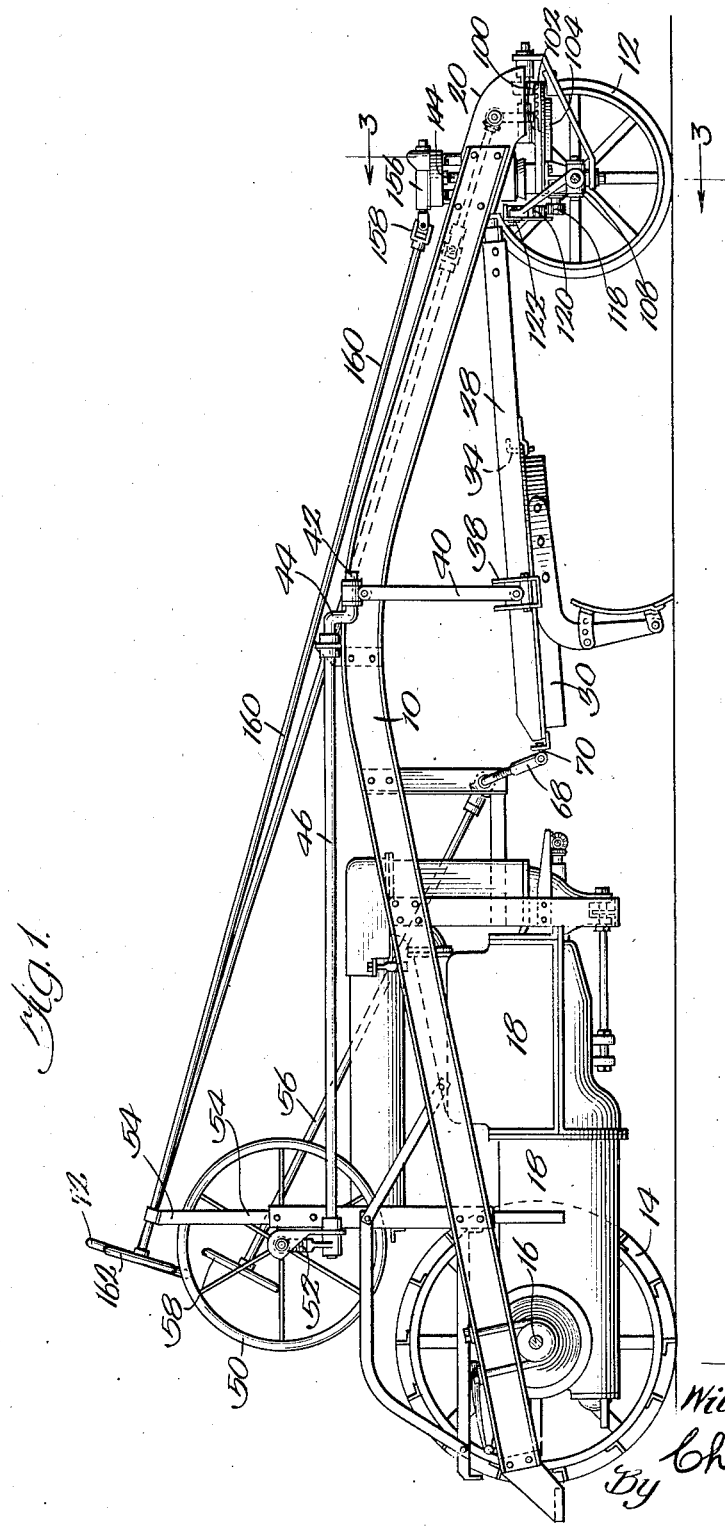

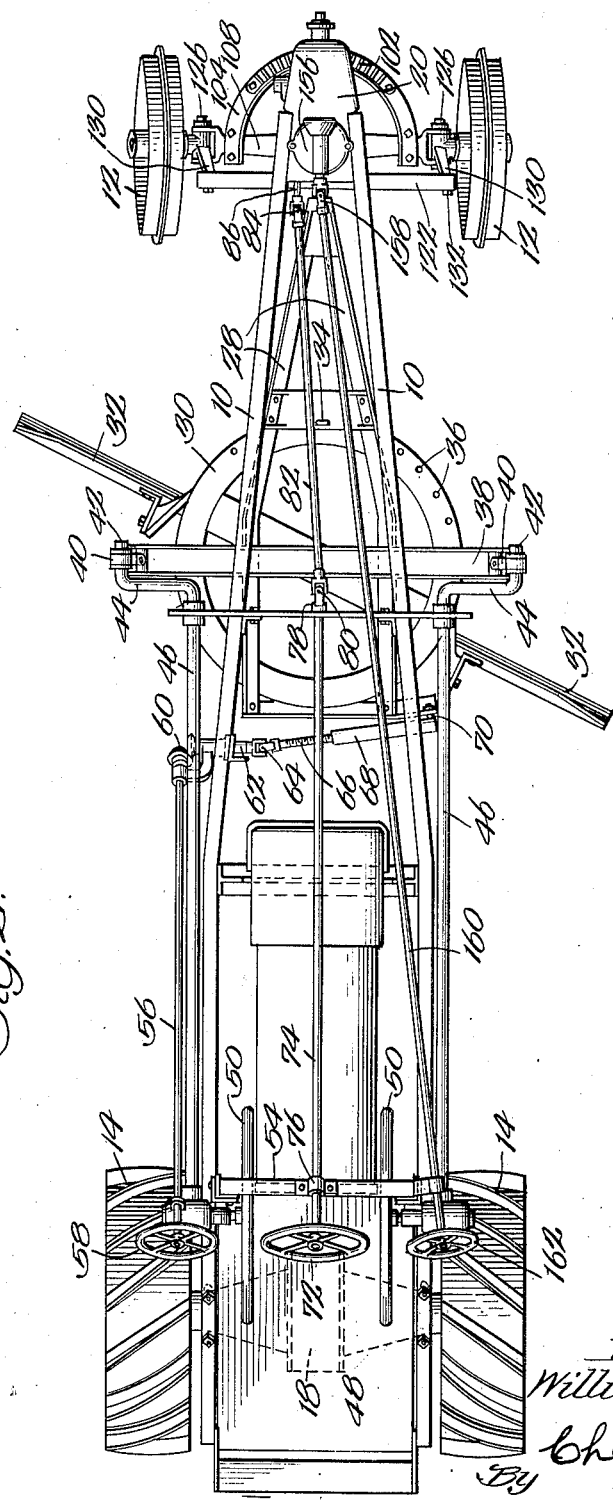

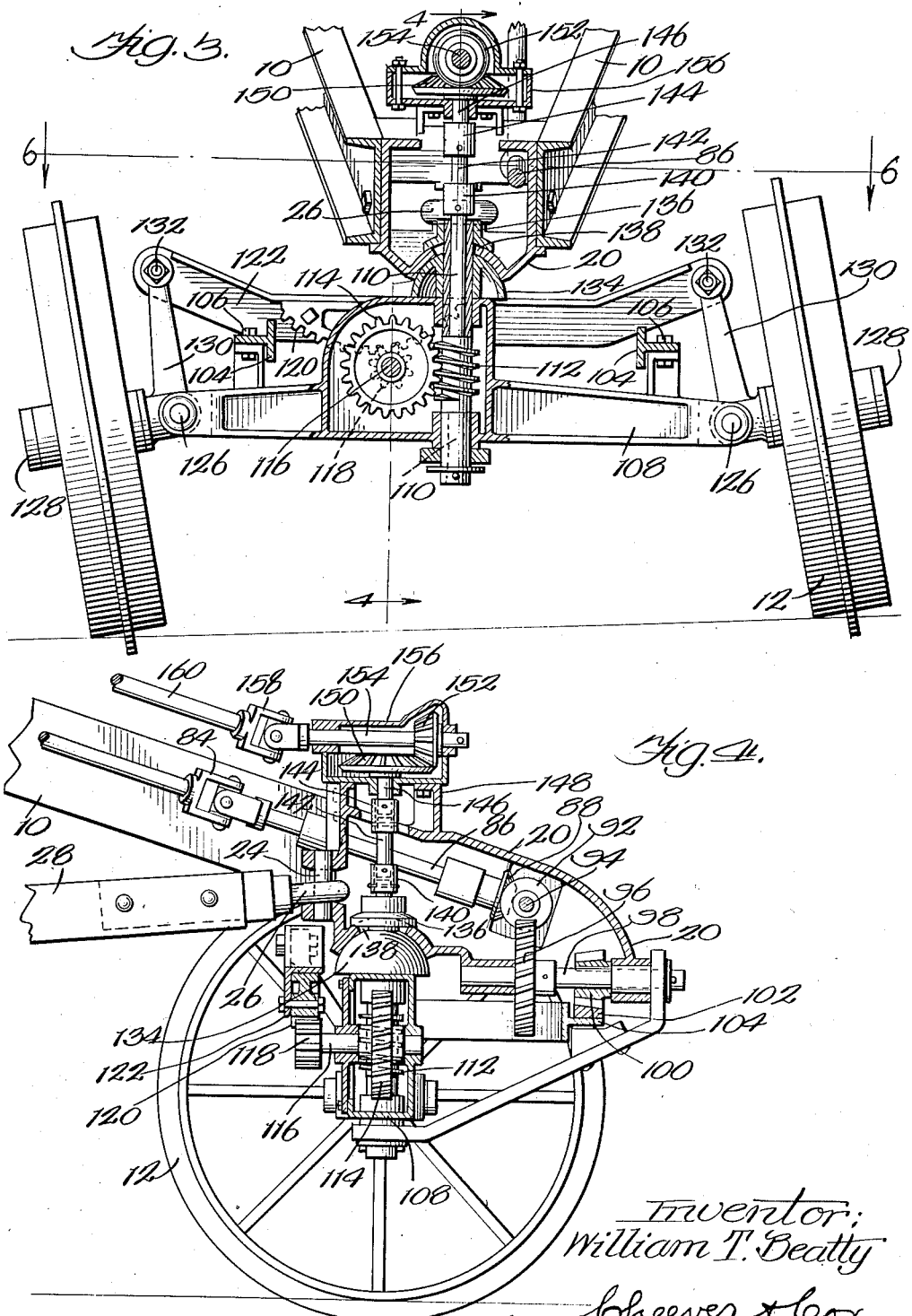

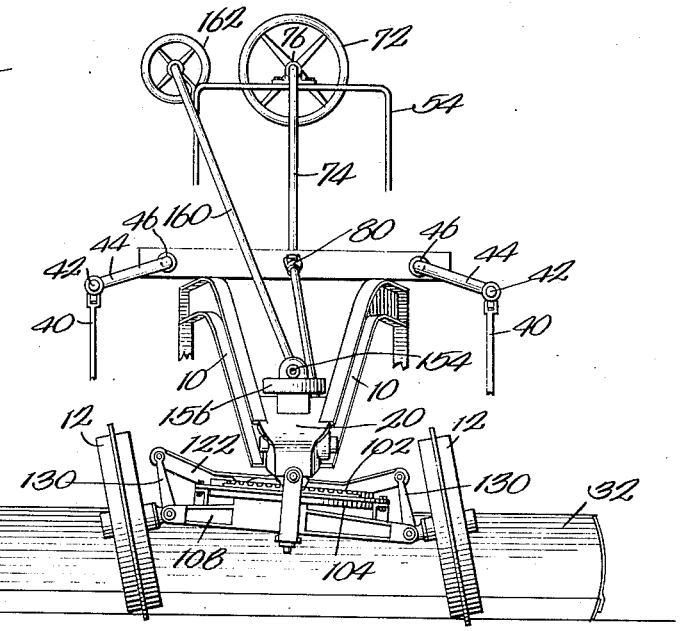

1,776,409

UNITED STATES PATENT OFFICE

WILLIAM T. BEATTY, OF FLOSSMOOR, ILLINOIS, ASSIGNOR TO AUSTIN MANUFACTURING CO., OF CHICAGO, ILLINOIS, A CORPORATION OF ILLINOIS

SELF-PROPELLED MOTOR GRADER WITH LEANING FRONT WHEELS

Application filed March 28, 1925. Serial No. 18,969.

This invention relates to road grading machines having a more or less angularly disposed blade scraping the road surface and at its front end cutting more or less the bank at the side of the road.

Until recently, all grading machines were made to be attached to some external power such as horses or tractors and these were of course attached at the front ends of the graders with the result that the front end of each machine was held to the work by its attachment to its tractive power and any overload of the machine resulted in the rear end of the machine sliding away from the work. To overcome this leaning wheels were first attached to the rear end of a road machine only where they were of the greatest benefit, but were afterwards attached to the front end also to help overcome the slight tendency which still remained for side slipping at that point.

Quite recently road machines have been developed in which the motive power is an integral part of the machine itself, see, for instance, my prior application Ser. No. 729,397. In every such machine, this motive power, which is a tractor, is always at the rear end of the machine and the weight thus provided at the rear end of the machine avoids any possibility of the machine slipping sideways as before when there was no such weight and removes the necessity of any leaning wheels at that point.

Machines of this tractor power driven class having been protected against sliding sideways at the rear end are now found to react to an overload by sliding sideways at the front end because they are no longer attached to anything at that end. To overcome this tendency, the machine of this invention for the first time applies leaning wheels to the front end of a machine of this character, thus affording the front end the protection against sliding sideways which it formerly did not need but which is now very necessary.

Broadly speaking, the invention consists in equipping a power driven tractor with leaning front wheels under control of the operator on the machine. More in detail, the invention consists in numerous features and details of construction hereafter set forth in the specification and claims which render the machine simple and comparatively easy to construct, efficient in operation and not readily liable to get out of order.

Referring to the drawings in which like numerals represent the same parts throughout the several views:

Figure 1 is a side elevation and Figure 2 a plan view of the complete mechanisms illustrating this invention in its preferred form.

Figure 3 is a front elevation taken on the line 3—3 of Figure 1.

Figure 4 is a detailed, sectional side view on the irregular line 4—4 of Figure 3.

Figure 5 is a front perspective view showing the front wheels in inclined position.

Figure 6 is a sectional, detailed plan view on the line 6—6 of Figure 3.

The arched frame 10 somewhat angularly pointed at its forward end is supported at its opposite ends by road traversing wheels; at its forward end by comparatively small, light, tiltable wheels 12, and at its rear by heavy power driven traction wheels 14 carried on the axle 16 of internal combustion engine 18, itself carried by the frame 10. The forward end of the frame 10 terminates in the housing 20, specifically a casting secured in place by any suitable means, as, for instance, bolts 22. At the rear of this housing is a vertical pivot 24 forming a bearing for the ring 26 at the forward end of generally horizontally disposed triangular blade carrying frame 28, sustaining at its rear portion a conventionally constructed blade carrying circle 30 to which the working blade 32 is suitably conventionally attached, as shown in the drawings. The circle 30 and consequently the blade is adjustable in horizontal, angular positions by selectively placing the locking pin 34, stationarily supported in the member 28 in a selected one of registering holes 36 in the circle 30. Extending across and rigidly secured to blade frame 28 is a bar 38. Rising from each end of this bar is a connecting rod 40 pivotally attached at its opposite end to the crank pin 42 carried by a crank 44 on a horizontally disposed shaft 46, extending back to a point in proximity to the operator's station or platform 48 at the rear of the engine. Each of these shafts 46 is at this point provided with an independent hand wheel 50 for operating it, each wheel, in the particular case here illustrated, being connected to the adjacent shaft through conventional gearing 52, not shown in detail, the result of this construction being that the operator can by conventionally operating the wheels 50 selectively raise and lower the opposite ends of bar 38 and consequently corresponding ends of the working blade 32.

Suitably mounted in frame parts 54, adjacent to the operator's station, is a downwardly angularly disposed shaft 56, terminating at the operator's station in a hand wheel 58, and at its lower end in gearing 60 driving a horizontal shaft 62 adjacent to the rear of frame 28. Shaft 62 is attached through a universal joint 64 to a screw 66 turning in a block 68 pivotally connected to frame 28 at 70, the result being that when the operator manipulates hand wheel 58, he rotates screw 66 in block 68 thus moving frame 28 and consequently blade 32 in a horizontal plane about pivot pin 24. The universal joint 64 and pivotal connections 70 are so constructed as to not interfere with vertical movement of the blade 32, as heretofore described.

At the rear of the machine, adjacent to the operator's station and preferably but not necessarily on the central axis of the machine, is a steering wheel 72 mounted on downwardly inclined shaft 74, journaled in frame bearings 76 and 78. The lower end of shaft 74 carries a universal joint 80 on a rod 82 connected at its opposite lower end through a universal joint 84 on a comparatively short shaft 86 suitably journaled in housing 20. On the extreme lower end of shaft 86 is a bevel gear 88 meshing with another bevel gear 90 driving the worm 92 on worm shaft 94 suitably journaled in the housing 20. Worm 92 meshes with a worm wheel 96 carried by a shaft 98 also journaled in housing 20. On this shaft 98 is a beveled gear 100 fitting with and driving an arcuate rack 102 rigid upon and consequently driving the horizontal fifth wheel 104 rigidly secured by any suitable means, as, for instance, the bolts 106, to the front axle 108 of the machine.

Front axle 108 rotates in a horizontal plane about vertically disposed king pin or shaft 110, itself rotatable in suitable supporting parts of housing 20. Shaft 110 carries a worm 112 meshing with a vertically disposed worm wheel 114 on a shaft 116, carrying a pinion 118, meshing with a curved segmental rack 120, rigidly secured on the under side of a generally horizontally disposed link or bar 122. Each end of axle 108 is equipped with a conventional horizontal pivot 126 on which is journaled a horizontal stub shaft 128 carrying the adjacent front wheel 12.

Rigid with each stub shaft 128 and vertically extending from a point near the adjacent pivot 126 is a vertical arm 120. The upper end of each such arm 130 has a pivotal connection 132 with the adjacent end of bar 122. The result of the construction just described is that rotation of shaft 110 to thereby cause pinion 118 to traverse rack 120 moves bar 122 lengthwise of axle 108 thus within predetermined limits tilting or inclining wheels 12, as shown in Figures 3 and 5, the direction of inclination, of course, depending on the direction of rotation of shaft 110 and the amount of inclination depending on the extent of such rotation of shaft 110.

The tilting of the wheels 12, as just described, results, as shown, particularly in Figure 5, in a corresponding tilting of axle 108 and bar 122 about the normal vertical axis of shaft 110 through housing 20. This movement is provided for by connecting shaft 110 to housing 20 through a more or less conventional ball joint bearing 134—136 which allows a possible rocking movement measured by the spaces 138 of Figure 3.

In order to permit of the operator's rotating shaft 110 in all inclined positions of the wheels 12, shaft 110 is connected at its upper end to universal joint 140 carried by a short shaft 142 in turn connected through another universal joint 144 to a short vertical shaft 146 journaled in an upward extension 148 of housing 20. At the upper end of shaft 146 is a bevel gear 150, meshing with a bevel pinion 152 on a shaft 154 contained within a supplemental housing 156. Outside of housing 156, shaft 154 is connected by a universal joint 158 to an inclined shaft 160 terminating at its upper end in a hand wheel 162 located immediately adjacent to the operator's station and in the particular case here illustrated on the opposite side from wheel 58.

With the mechanism just described, the operator can, from his station at the rear of the machine, manipulate hand wheel 162 to rotate shaft 110 in the proper direction and to the proper extent to incline the wheels 12 as shown in Figures 3 and 5 to produce straight travel of the machine along the work, this notwithstanding the tendency of the machine under the power of the engine 18 in the absence of a guiding tractor to cut into the side of the bank and remain there.

By the use of the machine of this invention, the operator can from his station not only control his engine by mechanism not shown but can steer the device by the use of wheel 72, can raise either end of the blade by manipulation of the proper wheel 50, and change the position of the blade crossways of the road by manipulation of the wheel 58 and by manipulation of wheel 162 he can incline the wheels 12 as required to resist the combination of forces influencing the course of the machine, set up by the various angles of blade adjustment together with the unique position of the propelling means more fully heretofore set forth.

Having thus described my invention, what I claim as new and desire to secure by Letters Patent is:

1. In a road machine, a frame, rear wheels therefor, a front steering axle, wheels supporting said axle, a pivot connection between said axle and said frame, a ball joint bearing concentric with said pivotal connection and interposed between said axle and said frame, an operator's station, means controllable from said station for selectively inclining the front wheels so as to resist side draft, a motor operatively connected with said rear wheels, and a cutting blade supported ahead of said motor.

2. In a road machine, a frame, rear wheels therefor, a front steering axle, wheels supporting said axle, a pivot connection between said axle and said frame, a ball joint bearing concentric with the pivotal connection and interposed between said axle and said frame, a motor operatively connected with said rear wheels, a cutting blade carried by the machine in front of said motor, an operator's station on the machine, and means within reach of the operator at said station for selectively inclining the front wheels so as to resist side draft.

3. In a road machine, a frame, rear wheels therefor, a front steering axle, wheels supporting said front axle, a pivotal connection between said axle and said frame, a ball joint bearing concentric with said pivotal connection and interposed between said axle and said frame, a motor supported by the frame adjacent to the rear wheels and operatively connected with said wheels, a cutter blade located in front of the motor, and means operable from a position adjacent to the motor and behind the blade for selectively inclining the front wheels so as to resist side draft.

4. In a road machine, a frame, rear wheels therefor, a front steering axle, wheels supporting said front axle, a pivotal connection between said axle and said frame, a ball joint bearing concentric with said pivotal connection and interposed between said axle and said frame, a motor operatively connected with the rear wheels to propel the machine, a laterally adjustable cutting blade located in front of the motor, means operable from a position adjacent the motor and behind the blade for selectively inclining the front wheels, and means operable from the same position for actuating said steering axle.

5. In a road machine, a frame, rear wheels therefor, a front steering axle, wheels supporting said front axle, a pivotal connection between said axle and said frame, a ball joint bearing concentric with said pivotal connection and interposed between said axle and said frame, a laterally adjustable earth working blade supported entirely in advance of the propelling means and operable in a manner to cause a side thrust to one side of the propelling means, means for swinging said front axle so as to steer the machine, and means for adjusting the front wheels so as to resist the side draft of the blade and propelling means during travel of the machine.

6. In a road machine, a frame, rear wheels therefor, a front steering axle, wheels supporting said front axle, a pivotal connection between said axle and said frame, a ball joint bearing concentric with said pivotal connection and interposed between said axle and said frame, a diagonally adjustable blade having an end positioned beyond the maximum width of wheel tread and operable in a manner to develop side draft thereon, said steering axle being supported in advance of said blade end, means for swinging said steering axle to steer the machine, and means independent of the steering means for selectively adjusting the front wheels to resist said side draft.

7. In a road machine, a frame, rear wheels for said frame, a front axle pivotally connected to said frame so as to steer the machine, a universal bearing interposed between said axle and said frame, wheels supporting said front axle and mounted for adjustment to inclined positions so as to resist side draft during travel of the machine, a link bar connecting said wheels so as to effect simultaneous adjustment thereof to such inclined positions, and means for manipulating said link bar, said means being operable at all times irrespective of the angular adjustment of said wheels.

8. In a road machine, a frame, rear wheels for said frame, a front axle pivotally connected to the frame so as to steer the machine, a universal bearing interposed between said axle and said frame, wheels supporting said front axle and mounted for adjustment to inclined positions so as to resist side draft during travel of the machine, a link bar connecting said wheels so as to effect simultaneous adjustment thereof to such inclined positions, an arcuate rack on said link bar, a pinion engaging said rack so as to shift said link bar at any time irrespective of the angular adjustment of said wheels, and means for operating said pinion.

9. In a road machine, a frame, rear wheels therefor, a front axle, front wheels supporting said axle and mounted for adjustment to inclined positions so as to resist side draft during travel of the machine, a pivot shaft rotatably supported in the front end of said frame and pivotally connecting the frame and the front axle, a ball joint bearing between the front axle and said frame, said bearing being concentric with said pivot shaft, an operating shaft and a universal joint connecting said pivot shaft and said operating shaft so as to maintain the operative relation of said shafts irrespective of any change in the angular relation of said frame and said axle.

10. In a road machine, a frame, rear wheels therefor, a front axle, front wheels supporting said axle and mounted for adjustment to inclined positions so as to resist side draft during travel of the machine, a pivot shaft rotatably supported in the front end of said frame and pivotally connecting the frame and the front axle, a ball joint bearing between the front axle and said frame, said bearing being concentric with said pivot shaft, an operating shaft and a universal joint connecting said pivot shaft and said operating shaft so as to maintain the operative relation of said shafts irrespective of any change in the angular relation of said frame and said axle, a steering shaft independent of said pivot shaft and its operating shaft, means operated by said steering shaft for swinging the axle so as to steer the machine, said steering shaft and the means operated thereby being provided with a universal joint so that the steering mechanism is operative irrespective of any change in the angular relation of the frame and the axle.

In witness whereof, I have hereunto subscribed my name.

WILLIAM T. BEATTY.